(12) United States Patent
Jiang et al.

(10) Patent No.: US 10,628,072 B2
(45) Date of Patent: Apr. 21, 2020

(54) SCALABLE ARCHITECTURE ENABLING LARGE MEMORY SYSTEM FOR IN-MEMORY COMPUTATIONS

(71) Applicant: Samsung Electronics Co., Ltd., Suwon-si, Gyeonggi-do (KR)

(72) Inventors: Dongyan Jiang, San Jose, CA (US); Qiang Peng, San Jose, CA (US); Hongzhong Zheng, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 16/180,003

(22) Filed: Nov. 4, 2018

(65) Prior Publication Data

US 2020/0065017 A1  Feb. 27, 2020

Related U.S. Application Data

(60) Provisional application No. 62/720,909, filed on Aug. 21, 2018.

(51) Int. Cl.
*G06F 12/00* (2006.01)
*G06F 3/06* (2006.01)

(52) U.S. Cl.
CPC .......... *G06F 3/0644* (2013.01); *G06F 3/0604* (2013.01); *G06F 3/0671* (2013.01)

(58) Field of Classification Search
CPC ..... G06F 3/0644; G06F 3/0604; G06F 3/0671
USPC ....................................................... 711/154
See application file for complete search history.

(56) References Cited

U.S. PATENT DOCUMENTS

| | | | | |
|---|---|---|---|---|
| 4,774,659 A | * | 9/1988 | Smith | G06F 12/1036 711/208 |
| 6,286,092 B1 | * | 9/2001 | Frank | G06F 12/1009 711/207 |
| 9,355,109 B2 | | 5/2016 | Archak et al. | |
| 9,799,017 B1 | | 10/2017 | Vermeulen et al. | |
| 2004/0205092 A1 | * | 10/2004 | Longo | G06F 3/0613 |

(Continued)

OTHER PUBLICATIONS

Wang, Longxiang et al., "DOMe: A deduplication optimization method for the NewSQL database backups", PLoS One 12(10): e0185189. https://doi.org/10.1371/journal.pone.0185189, Xi'an, Shaanxi, P.R. China.

*Primary Examiner* — Titus Wong
(74) *Attorney, Agent, or Firm* — Renaissance IP Law Group LLP

(57) ABSTRACT

A memory system provides deduplication of user data in the physical memory space of the system for user data that is duplicated in the virtual memory space of a host system. A transaction manager (TM) uses a transaction table to maintain data coherency and data concurrency for the virtual memory space. A write data engine manager (WDEM) uses an outstanding bucket number and command queues to maintain data coherency and data concurrency for the physical memory space. The WDEM receives data write requests from the TM and sends a corresponding write command to a selected command queue. A write data engine responds to a write command in a command queue by storing the data in an overflow memory region if the data is not duplicated in the virtual memory space, or by incrementing a reference counter for the data if the data is duplicated in the virtual memory space.

20 Claims, 9 Drawing Sheets

(56) References Cited

U.S. PATENT DOCUMENTS

| | | | |
|---|---|---|---|
| 2009/0113121 A1* | 4/2009 | Lee | G06F 12/0246 |
| | | | 711/103 |
| 2010/0011028 A1* | 1/2010 | Dade | G06F 16/2255 |
| | | | 707/E17.037 |
| 2011/0307447 A1* | 12/2011 | Sabaa | H04L 67/2842 |
| | | | 707/637 |
| 2013/0238572 A1* | 9/2013 | Prahlad | G06F 3/0649 |
| | | | 707/692 |
| 2014/0281357 A1* | 9/2014 | Duluk, Jr. | G06F 11/0793 |
| | | | 711/206 |
| 2014/0304464 A1* | 10/2014 | Bert | G06F 3/0641 |
| | | | 711/105 |
| 2015/0193170 A1* | 7/2015 | Sundaram | G06F 3/0641 |
| | | | 711/103 |
| 2016/0371295 A1 | 12/2016 | Aronovich et al. | |

* cited by examiner

FIG. 4

SCALABLE ARCHITECTURE ENABLING LARGE MEMORY SYSTEM FOR IN-MEMORY COMPUTATIONS

CROSS-REFERENCE TO RELATED APPLICATION

This application claims the priority benefit under 35 U.S.C. § 119(e) of U.S. Provisional Application No. 62/720,909 filed on Aug. 21, 2018, the disclosure of which is incorporated herein by reference in its entirety.

TECHNICAL FIELD

The subject matter disclosed herein relates to memory systems. More specifically, the subject matter disclosed herein relates to a memory system that provides deduplication of user data in the physical memory space of the system for user data that is duplicated in the virtual memory space of a host system.

BACKGROUND

Artificial Intelligence (AI), big data, and in-memory processing use increasingly larger memory capacities. To meet this demand, in-memory deduplication systems (dedupe-DRAM) have been developed. Unfortunately, typical dedupe systems have some drawbacks. For example, the deduplication translation table may grow non-linearly as the size of the virtual memory grows. Additionally, deduplication operations typically result in some amplification of read and write latencies, that is, a single logical read or write may require multiple physical reads or writes, thereby reducing performance.

SUMMARY

An example embodiment provides a memory system that may include at least one system partition that may include a physical memory, at least one transaction manager (TM), at least one write data engine manager (WDEM), and a write data engine (WDE). The physical memory may have a physical memory space of a first predetermined size. The at least one TM may receive data write requests and corresponding data from a host system, and the at least one TM may use a transaction table to maintain data coherency and data consistency for a virtual memory space of the host system. The at least one WDEM may include at least one command queue, and the WDEM may use an outstanding bucket number (OBN) and command queues to maintain data coherency and data consistency for the physical memory space. The WDEM may receive the data write requests from the TM and send a write command corresponding to each data write request to a selected command queue of the at least one command queue. A WDE may correspond to each command queue. The WDE may respond to a write command stored in the command queue corresponding to the WDE by storing the data corresponding to a data write request in an overflow memory region if the data is not duplicated in the virtual memory space, or may increment a reference counter for the data if the data corresponding to a data write request is duplicated in the virtual memory space. In one embodiment, the virtual memory space may include a second predetermined size that is greater than or equal to the first predetermined size of the physical memory space, and the memory system may further include a translation table that may include a first predetermined number of bits corresponding to the second predetermined size of the virtual memory space, a second predetermined number of bits corresponding to the first predetermined size of the physical memory and a third predetermined number of bits for a data granularity in which the second predetermined number of bits and the third predetermined number of bits may be subsets of the first predetermined number of bits.

An example embodiment provides a memory system that may include a plurality of system partitions in which at least one system partition may include a physical memory, at least one transaction manager (TM), at least one write data engine manager (WDEM), a memory regional manager (MRM), and a memory regional manager (MRM). The physical memory may have a physical memory space of a first predetermined size, and may include a plurality of memory regions. The at least one TM may receive data write requests and corresponding data from a host system, and the at least one TM may use a transaction table to maintain data coherency and data consistency for a virtual memory space of the host system. The virtual memory space may include a second predetermined size that is greater than or equal to the first predetermined size of the physical memory space. The at least one TM may use a translation table to translate the virtual memory space of the host system to the physical memory space of the at least one system partition. The at least one WDEM may include at least one command queue, and the WDEM may use an outstanding bucket number (OBN) and command queues to maintain data coherency and data consistency for the physical memory space. The WDEM may receive the data write requests from the TM and send a write command corresponding to each data write request to a selected command queue of the at least one command queue. A WDE may corresponding to each command queue, and the WDE may respond to a write command stored in the command queue corresponding to the WDE by storing the data corresponding to the write request in an overflow region if the data is not duplicated in the virtual memory space, or by incrementing a reference counter for the data if the data corresponding to a data write request is duplicated in the virtual memory space. An MRM may correspond to each memory region of the physical memory, and an MRM may include a reference counter storage space for data stored in the memory region, and may control WDE access to the memory region corresponding to the MRM. In one embodiment, the translation table may include a first predetermined number of bits corresponding to the second predetermined size of the virtual memory space, a second predetermined number of bits corresponding to the first predetermined size of the physical memory and a third predetermined number of bits for a data granularity in which the second predetermined number of bits and the third predetermined number of bits may be subsets of the first predetermined number of bits.

An example embodiment provides a deduplication memory system that may include a plurality of system partitions in which at least one system partition may include a physical memory, at least one transaction manager (TM), at least one write data engine manager (WDEM), and a write data engine (WDE). The physical memory may have a physical memory space of a first predetermined size. The at least one TM may receive data write requests and corresponding data from a host system, and the at least one TM may use a transaction table to maintain data coherency and data consistency for a virtual memory space of the host system. The virtual memory space may include a second predetermined size that is greater than or equal to the first predetermined size of the physical memory space. The at least one TM may use a translation table to translate the virtual memory space of the host system to the physical memory space of the at least one system partition in which the transaction table may include a first predetermined number of bits corresponding to the second predetermined size of the virtual memory space, a second predetermined number of bits corresponding to the first predetermined size of the physical memory and a third predetermined number of bits for a data granularity and in which the second predetermined number of bits and the third predetermined number of bits may be subsets of the first predetermined number of bits. The at least one WDEM may include at least one command queue, and the WDEM may use an outstanding bucket number (OBN) and command queues to maintain data coherency and data consistency for the physical memory space. The WDEM may receive the data write requests from the TM and may send a write command corresponding to each data write request to a selected command queue of the at least one command queue. A WDE may correspond to each command queue. The WDE may respond to a write command stored in the command queue corresponding to the WDE by storing the data corresponding to the write request in an overflow region if the data is not duplicated in the virtual memory space, or may increment a reference counter if the data corresponding to a data write request is duplicated in the virtual memory space.

BRIEF DESCRIPTION OF THE DRAWINGS

In the following section, the aspects of the subject matter disclosed herein will be described with reference to exemplary embodiments illustrated in the figures, in which:

FIG. 4 depicts some details about an example embodiment of a relationship of a virtual memory space and a physical memory space for the deduped memory system of FIG. 1 in which the relationship may be used by the translation table to translate the virtual memory space of a host system to the physical memory space of a system partition according to the subject matter disclosed herein;

DETAILED DESCRIPTION

Figure 1:
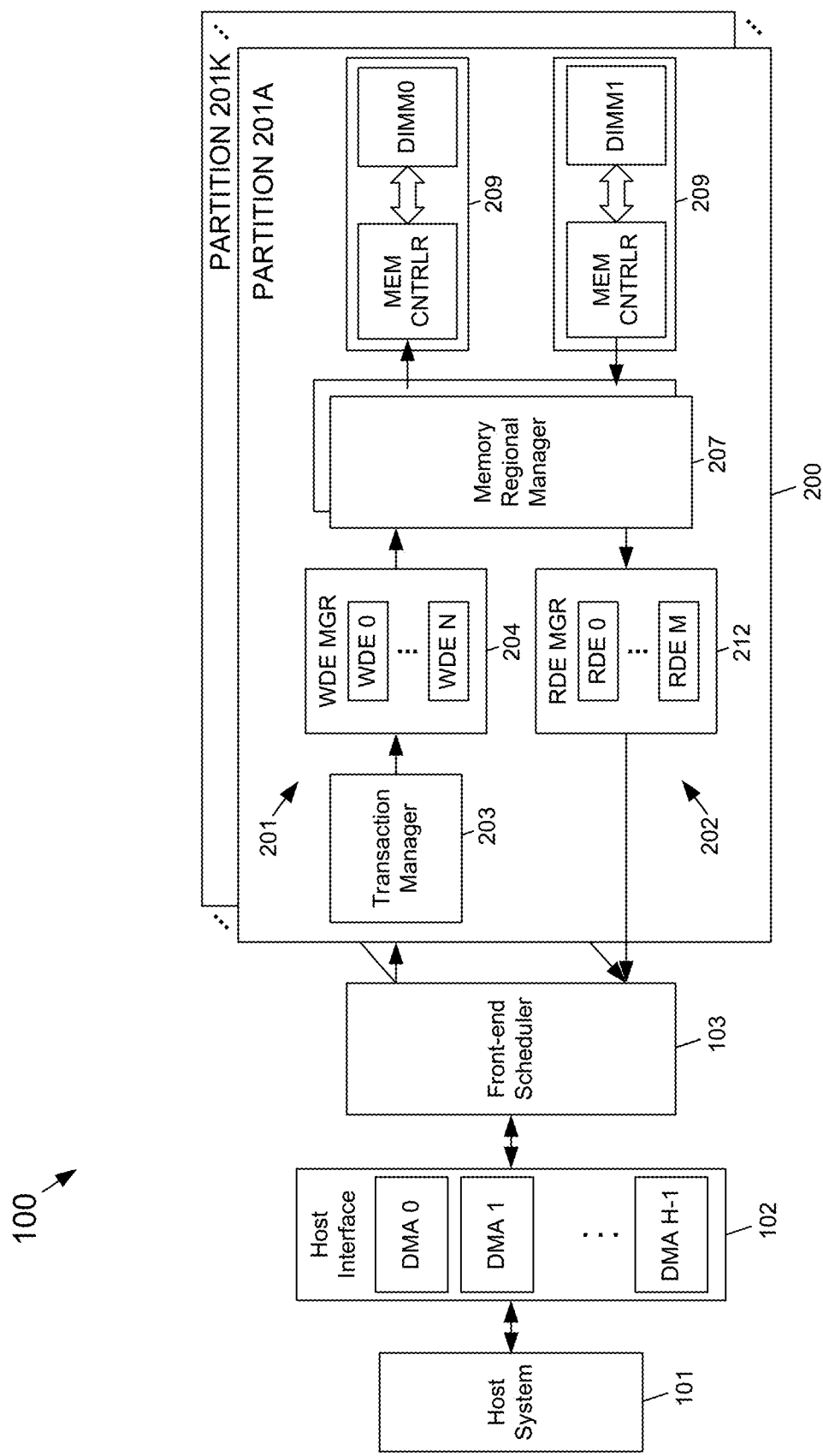
FIG. 1 depicts a block diagram of an example embodiment of a scalable deduplication memory system architecture according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein. Additionally, the described aspects can be implemented to perform low power, 3D-depth measurements in any imaging device or system, including, but not limited to, a smartphone, a User Equipment (UE), and/or a laptop computer.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provides functionality described herein in connection with the various components and/or functional blocks.

The subject matter disclosed herein provides a large-scale deduplication memory system architecture having a translation table that does not increase non-linearly in size as the virtual memory size of the system increases. In one embodiment, the memory system architecture disclosed herein includes a plurality of system partitions in which the functionality within each system partition may be parallelized to provide a high throughput and a low latency.

In one embodiment, a system partition may include one or more transactions managers that may be configured to manage the virtual memory space of the memory system and in so doing provides concurrency and coherency for the virtual memory space. Additionally, each transaction manager may support multiple outstanding transactions and may also support multiple threads in which each thread may include multiple outstanding transactions.

A system partition may also include one or more data engine managers that may be configured to manage the physical memory space of the system partition. A data engine manager may also be configured to manage a plurality of parallel data engines. The multiple data engines may perform memory address interleaving for multiple orthogonal memory regions of a system partition to provide high throughput. As used herein with respect to the multiple memory regions, the term "orthogonal" means that any data engine may access any memory region of a system partition. For a write access, a memory write conflict is managed by a WDEM (Write Data Engine Manager) before the data arrives at a Write Data Engine (WDE). After the data arrives at a WDE, the memory access conflicts have been removed. For a read access, a Read Data Engine (RDE) has no memory access conflict and can access any memory region without restrictions. A Memory Regional Manager manages the memory regions associated with the applications, such as different dedupe memory regions. Thus, a physical memory conflict has been removed by a WDE Manager "orthogonally".

The memory system architecture disclosed herein also provides a reference counter (RC) that may be embedded in user data stored in the physical memory of the system and that may reduce the amount of memory that is used by the memory system. In one embodiment, the reference counter provides an indication of the number of times the data in which the reference counter is embedded is duplicated in the virtual memory space of the system. In one embodiment, embedding the reference counter in the user data may reduce system memory requirements by about 6% for a user data granularity of 64 bytes. In another embodiment, embedding the reference counter in the user data may reduce system memory requirements by about 12% for a user data granularity of 32 bytes.

In other embodiments in which the number of times the user data may be duplicated in the virtual memory space of the system is equal to or greater than a predetermined number of times, the field used for the reference counter may be replaced with a field that provides an index to an extended reference counter table or to a special data pattern table. In still another embodiment, a translation table used by the system may include an entry having a pointer or an index to a special data pattern table if the number of times the user data is duplicated in the virtual memory space of the system is equal to or greater than a predetermined number of times, thereby reducing latency and increasing throughput. By placing a pointer or an index in the translation table, user data that is highly duplicated in the virtual memory space may be automatically detected when the translation table is accessed. Additionally, such highly duplicated user data may be more easily analyzed through the automatic detection provided by such a configuration of the translation table.

FIG. 1 depicts a block diagram of an example embodiment of a scalable deduplication memory system architecture 100 according to the subject matter disclosed herein. The system architecture 100 may include one or more host devices or systems 101, a host interface 102, a front-end scheduler 103 and a plurality of system partitions 200A-200K. A host system 101 may be communicatively coupled to the host interface 102, and the host interface may be communicatively coupled to the front-end scheduler 103. The host interface 102 may include one or more direct memory access (DMA) devices DMA 0-DMA H-1. The front-end scheduler 103 may be communicatively coupled to each of the plurality of system partitions 200A-200K. The host system 101, the host interface 102 and the front-end scheduler 103 operate in a well-known manner.

A system partition 200 may include a write data path 201 and a read data path 202. The write data path 201 may include a transaction manager (TM) 203, a write data engine WDE manager (WDEM) 204, one or more memory regional managers (MRMs) 207, and one or more memory regions (MRs) 209. In one embodiment, the write data path 201 may include a TM 203. In one embodiment, there is one TM 203 and one WDEM 204 per partition. The MRs 209 are depicted in FIG. 1 as including a memory controller (MEM CNTRLR) and a dual in-line memory module (DIMM). Other embodiments may include equivalent components for the MRs 209. The memory of the MRs 209 may be, but is not limited to, dynamic random access memory (DRAM), static random access memory (SRAM), volatile memory and/or non-volatile memory.

Figure 2:
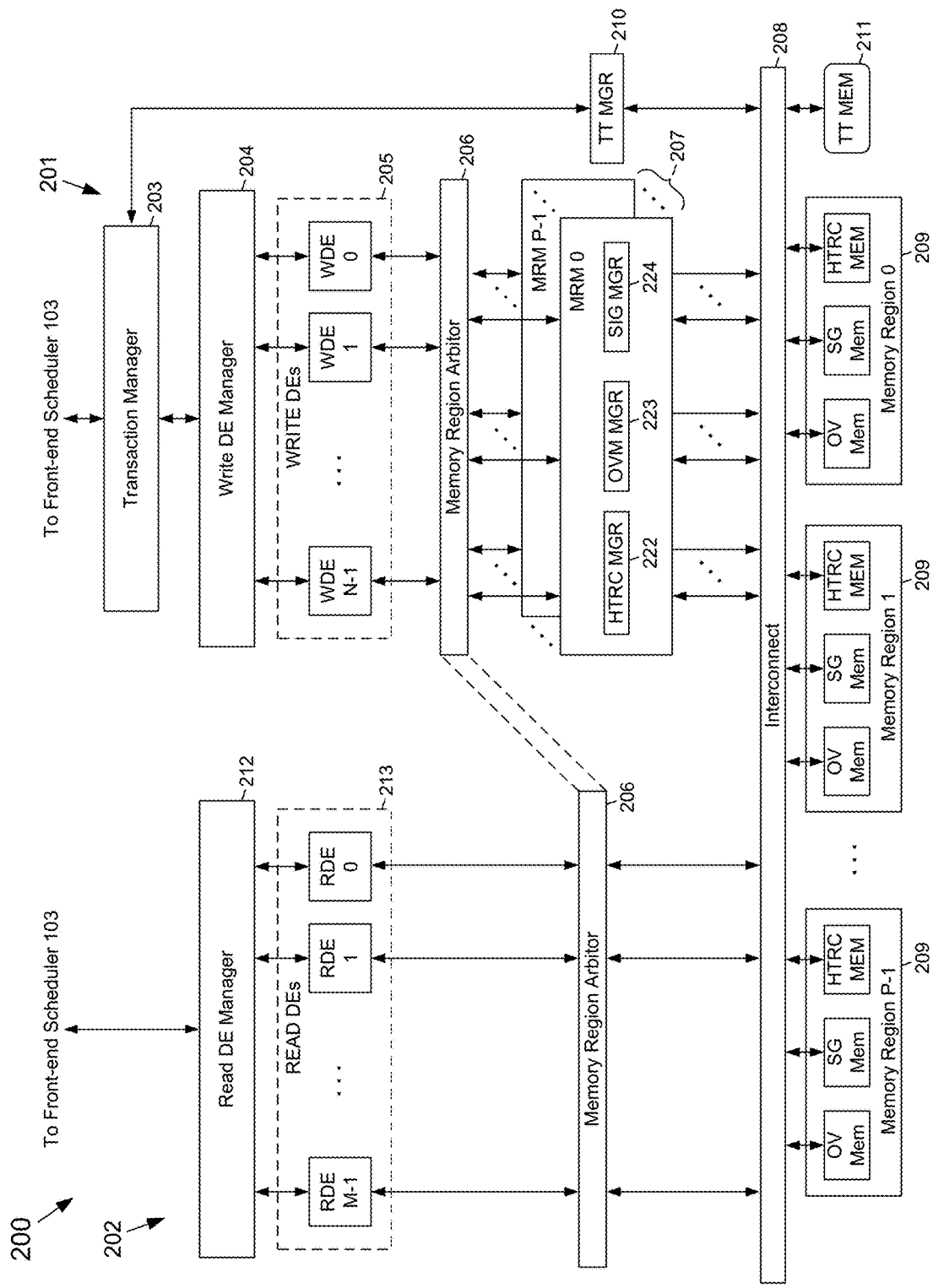
FIG. 2 depicts a more detailed block diagram of an example embodiment of a system partition depicted in FIG. 1 according to the subject matter disclosed herein.

In comparison to the write data path 201, the read data path 202 may be relatively simple because there are no data coherency or data concurrency issues associated with the read data path. As depicted in FIGS. 1 and 2, the read data path 202 may include the one or more MRs 209, the one or more MRMs 207 (FIG. 1), a read data engine (RDE) manager (RDEM) 212, and one or more RDEs 213. A data read request received from the host system 101 may involve the translation table (FIG. 4), and an access to the appropriate(s) memory region(s) to provide the requested read data through the read data path 202 in response to the data read access.

FIG. 2 depicts a more detailed block diagram of an example embodiment of a system partition 200 depicted in FIG. 1 according to the subject matter disclosed herein. The architecture of a system partition 200 may be parallelizable so that multiple transactions and multiple threads (and their multiple transactions) may be processed in a manner to provide a high throughput.

The write data path 201 of the partition 200 may include the TM 203, the WDEM 204, one or more WDEs 205 (WDE 0-WDE N-1), a memory region arbiter 206, the MRMs 207 (MRM 0-MRM P-1), an interconnect 208, and the one or more MRs 209 (MR 0-MR P-1). The read data path 202 of the partition 200 may include the MRs 209, the interconnect 208, the memory region arbiter 206, the RDEM 212 and one or more read data engines (RDEs) 213. A system partition may also include a translation table (TT) manager (TT MGR) 210 and a TT memory (TT MEM) 211. Each of the system partitions 202A-202K (FIG. 1) may be similarly configured.

Components, such as the memory region arbiter 206 and the interconnect 208 operate in a well-known manner and will not be described in detail herein. Additionally, the memory region arbiter 206 has been depicted in FIG. 2 as being in both the write data path 201 and the read data path 202 by dashed lines, however, it should be understood that each respective path may actually include a separate memory region arbiter that communicates and coordinates with the other memory region arbiter. It should be noted that the read data path 202, as depicted in FIG. 1, "passes through" the MRM 207, but not as depicted in FIG. 2, because the RDEM 212 only needs to read the translation table to obtain the PLID for the physical memory location and then RDEs 213 read the memory location indexed by PLID. Additionally, the components depicted in FIGS. 1 and 2 may be embodied as modules that may include software, firmware and/or hardware that provide functionality described herein in connection with the various components and/or functional blocks.

Figure 3:
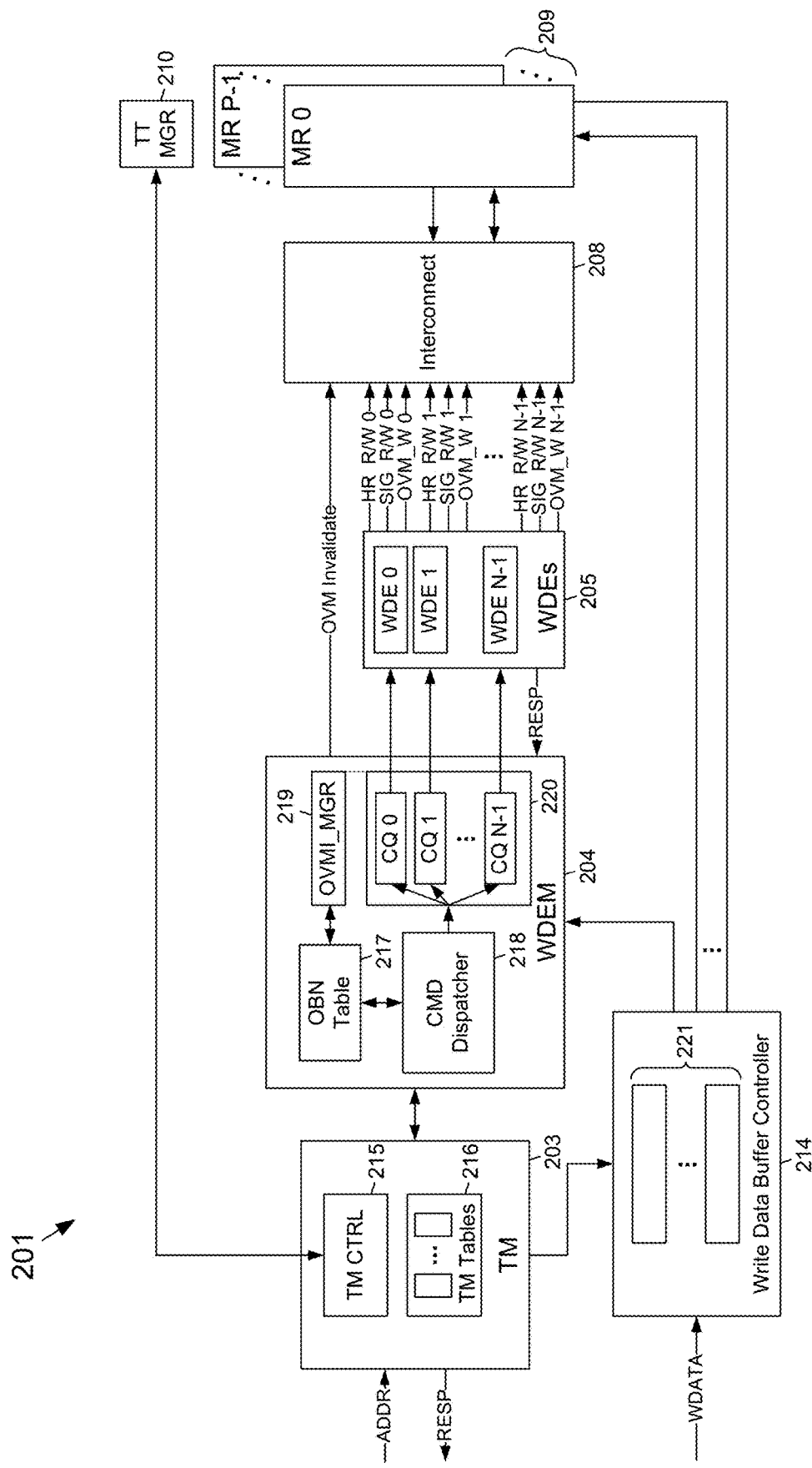
FIG. 3 depicts another block diagram of an example embodiment of several of the components of the write data path of a system partition according to the subject matter disclosed herein.

FIG. 3 depicts another block diagram of an example embodiment of several of the components of the write data path 201 of a system partition 200 according to the subject matter disclosed herein. More specifically, the components of the system partition 200 depicted in FIG. 3 may include the TM 203, the WDEM 204, the WDEs 205, the interconnect 208 and the MRs 209. Additionally, the write data path may include a write data buffer controller 214.

Referring to FIGS. 1-3, the TM 203 may include a TM controller 215 and one or more transaction tables 216. The transaction tables 216 may be used to keep track of outstanding write transactions occurring between the host system 101 and the memory 209. The WDEM 204 may include an outstanding bucket number (OBN) table 217, a command (CMD) dispatcher 218, an overflow memory invalidate (OVMI) manager 219, and one or more command queues (CQ) 220 (CQ 0-CQ N-1). The WDEs 205 may include one or more WDEs (WDE 0-WDE N-1). The write data buffer controller 214 may include one or more write data buffers 221.

The TM 203 may be configured to manage the data coherency and data concurrency of the virtual memory space of the host system. In one embodiment, the TM 203 may be configured to support multiple outstanding write transactions and multiple threads to provide a high data throughput. In one embodiment, a transaction table 216 may contain a list of outstanding write transactions. In another embodiment, a transaction table 216 may contain a list of multiple threads each having multiple outstanding write transactions. When a data write request is received from the host system 101, the TM 203 assigns a transaction identification number (ID) to a write data request, and the transaction ID and other metadata is entered into a selected transaction table 216. Data associated with a write data request may be stored in a write data buffer 221. The transaction ID and information related to the data in the write data buffer 221 may be sent downstream for further processing by the write data path 201. The TM 203 may also use the one or more of the TM tables 216 to keep completions of posted memory writes in a sequential order in the host system/virtual memory space.

Figure 4:
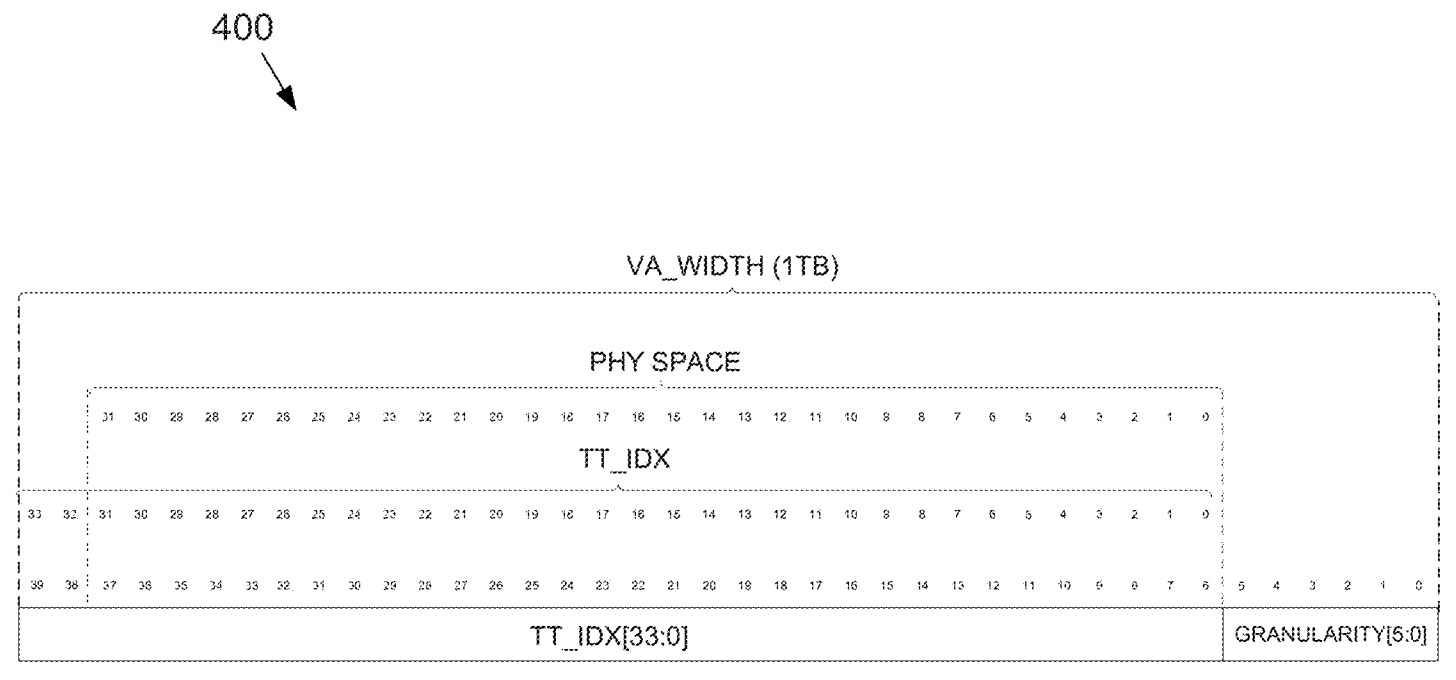

FIG. 4 depicts some details about an example embodiment of a translation table 400 that may be used by the TM 203 and the RDEM 212 to keep track of data location in physical memory space of a system partition 200 according to the subject matter disclosed herein. The particular example embodiment of the translation table 211 and 400 is for a virtual memory space of 1 TB (i.e., $2^{40}$ bytes), and is indicated by VA_WIDTH. The deduplication granularity (data granularity) is 64 B (i.e., $2^6$ bits). The physical memory space of the translation table 400 is 256 GB (i.e., $2^{38}$ bytes), and is indicated by PHY SPACE. The system translation table index TT_IDX shown has 34 bits. The partitioning provided by the system partition 200 results in the index of the translation table 211 staying within 32 bits, that does not dramatically increase the size of the translation table as the size of the user data stored in the MR 209 increases. In an alternative embodiment, the virtual memory size, the physical memory size and the deduplication (data) granularity may be different from that depicted in FIG. 4.

Figure 5:
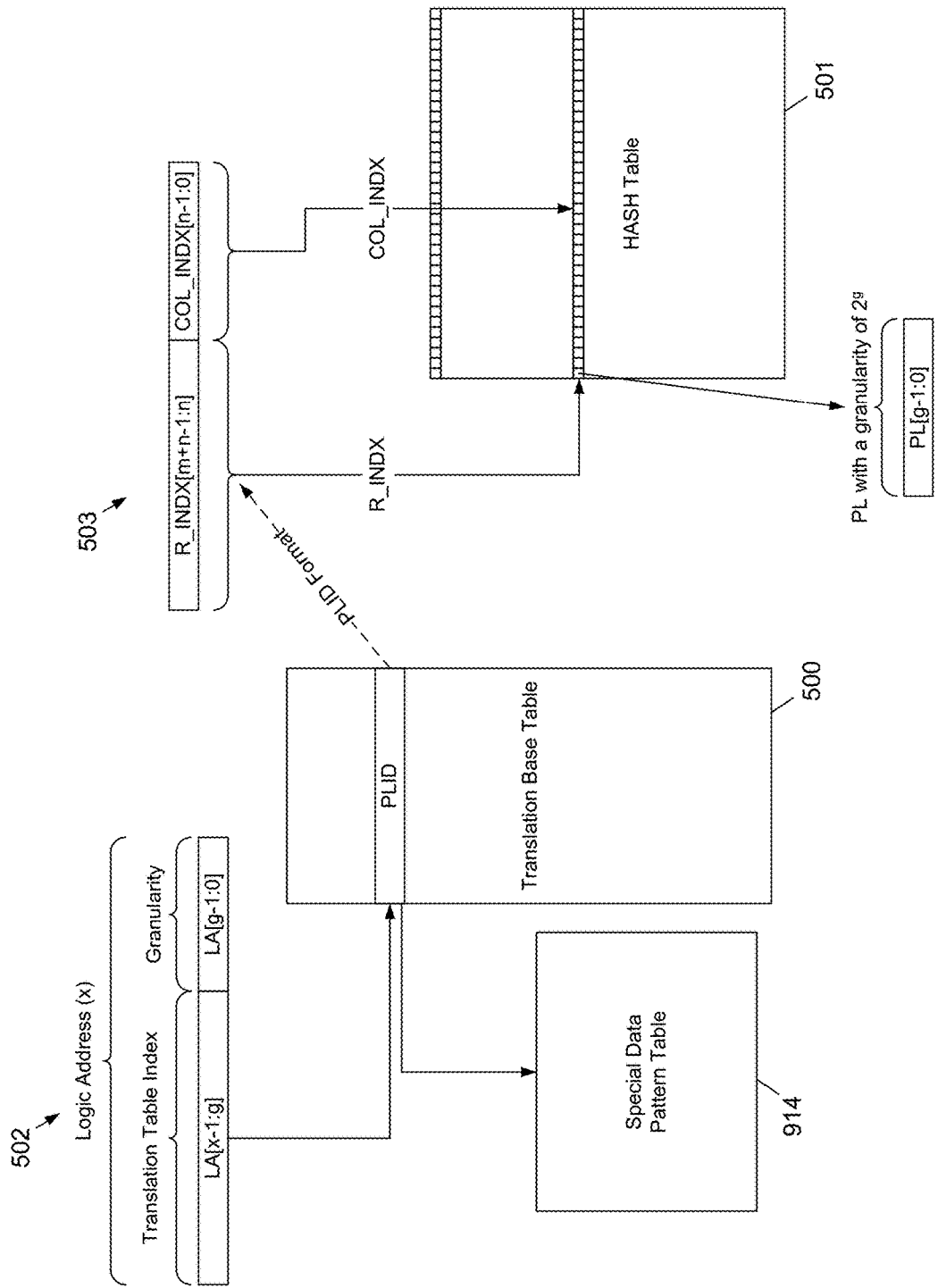
FIG. 5 depicts a relationship between translation table entries of an example translation table and hash table entries of an example hash table according to the subject matter disclosed herein.

FIG. 5 depicts a relationship between translation table entries of an example translation table 500 and hash table entries of an example hash table 501 according to the subject matter disclosed herein. With reference to FIGS. 2 and 5, in one embodiment, the translation table 500 may be stored at in the TT MEM 211, and the hash table 501 may be stored in an HTRC MEM in a MR 209. A logical address 502 received from a host system 101 includes a translation table index (FIG. 4, TT_IDX) and a granularity. The translation table index provides an index to a physical line identification (PLID) entry in the translation table 500. The format 503 of the PLID entry includes a row (i.e., a hash bucket) index (R_INDX) and a column index (COL_INDX) to the hash table 501). The contents contained at a particular row and a particular column of the hash table 501 is a physical line (PL) that may be a particular user data having granularity of $2^g$. If, for example, g is equal to 6, then the granularity of a PL would be 64 bytes.

In one embodiment, the hash table index (i.e., both the row index and the column index) may be generated by a hash function h performed on the user data. Because the hash table entry is generated by a hash function h performed on the user data C, only a portion C" of the user data needs to be stored in the PL. In other words, if C represents a user data of granularity $2^g$, and C" represents a part of the user data C that needs to be stored in the hash table, then C' represents a part of the user data C that may be reconstructed from C" using the hash function h. That is, $$C=\{C',C''\}=\{f(C''),C''\}. \qquad (1)$$

The space, or field, in the PL corresponding to C' may be used for other purposes, such as storing reference counter (RC) information relating to the number of times the user data C is duplicated in the virtual memory of the host system 101. The space, or field, in the PL corresponding to C' may be referred to as a reconstructed field.

Figure 6:
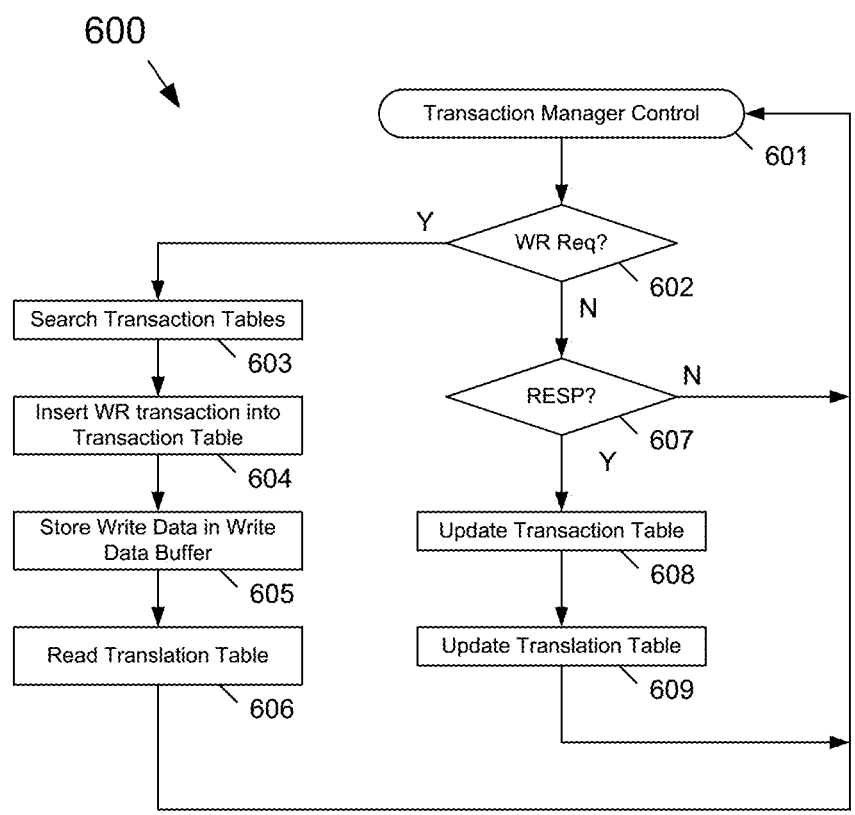
FIG. 6 depicts a flow diagram of an example control process provided by a transaction manager according to the subject matter disclosed herein.

FIG. 6 depicts a flow diagram of an example control process 600 provided by the transaction manager TM 203 according to the subject matter disclosed herein. At 601, the TM 203 may be in an idle loop waiting to receive a data write command from the host system 101, or to receive a response from a WEDM 203. At 602, if a data write command is received from the host system 101, flow continues to 603 where the transaction tables 216 are searched. At 604, the data write command is assigned a transaction ID and inserted into the appropriate transaction table 216. At 605, the write data is entered into a write data buffer 219. At 606, the translation table 211 is read to get old physical line identification (PLID) information, and flow returns to 601.

If, at 602, a data write command is not received, flow continues to 607 where it is determined whether a response from a WEDM 204 has been received. If not, flow returns to 601. If so, flow continues to 608 where a transaction table 216 is updated. At 609, the translation table 211 is updated. The flow then returns to 601.

The WDEM 204 may be configured to manage the data coherency and data concurrency of the physical memory space of within a partition 200 by managing the WDEs 205. In one embodiment, the WDEM 204 may maintains multiple outstanding writes and internal read/write transactions/threads to different WDEs 205 using the command dispatcher 219 and the command queues 220 (i.e., CQ 0-CQ N-1). The WDEM 204 operates to ensure that write transactions to the same hash bucket are executed in order by sending the write transactions to the same hash bucket to the same command queue CQ. The WDEM 204 may also merge partial cache line writes and perform memory management for an overflow memory (OV MEM) region in the MRs 209.

The WDEM 204 may include an outstanding bucket number (OBN) table 219 that may be used to track hash table bucket numbers and status of outstanding write commands. A command dispatcher 218 may assign commands to different WDEs 205 by storing write commands in selected CQs 220. The WDEM 204 may also include an OVM invalidate table (not shown).

Figure 7:
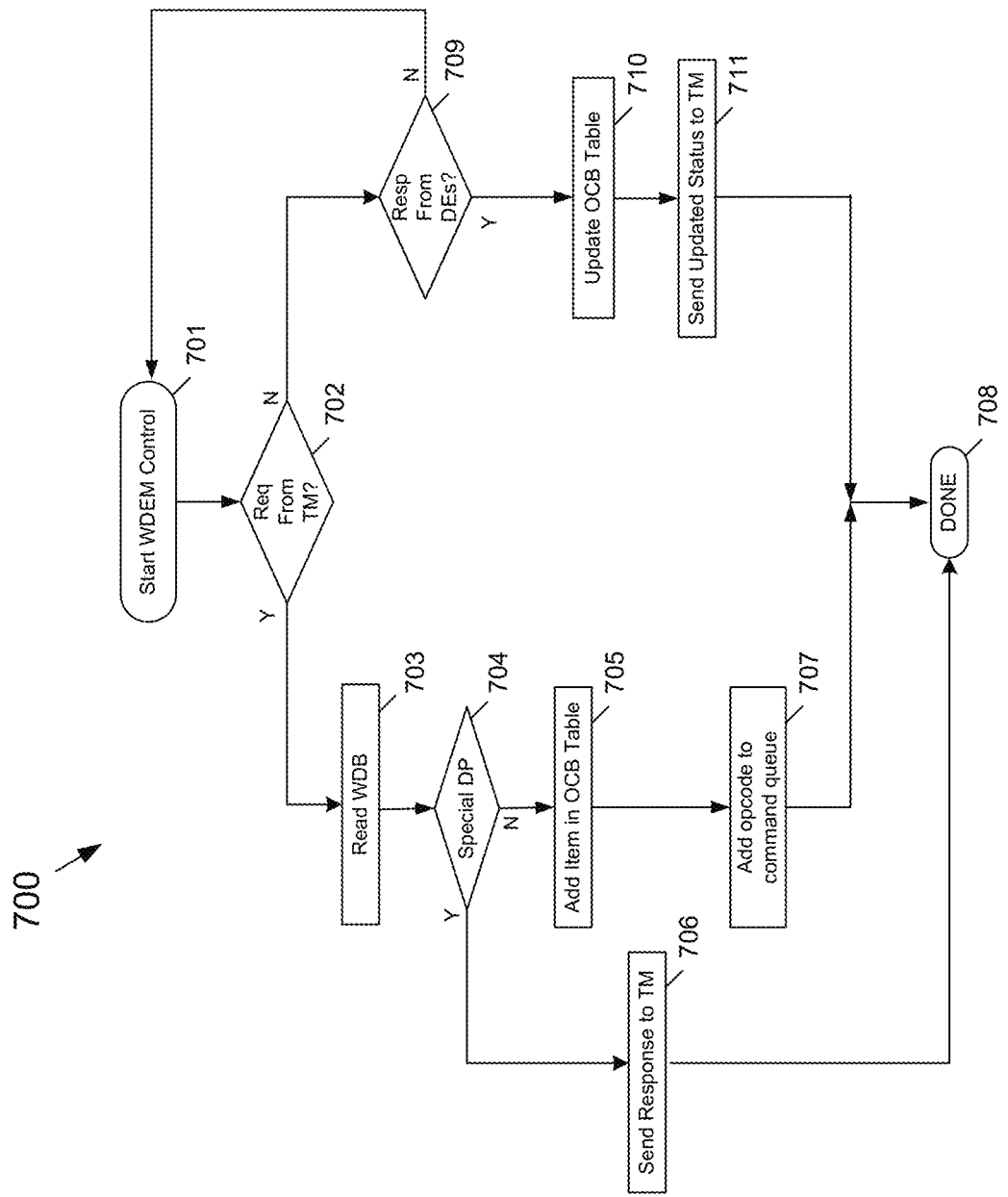
FIG. 7 depicts a flow diagram of an example control process provided by a write data engine manager according to the subject matter disclosed herein.

FIG. 7 depicts a flow diagram of an example control process 700 provided by the WEDM 204 according to the subject matter disclosed herein. The control process starts at 701. At 702, it is determine whether a write data command has been received from the transaction manager TM 203 with write data buffer ID and old PLID information. If so, flow continues to 703 where the write data table is read. At 704, if the write data red from write data buffer 221 labeled as special data pattern, flow continues to 706 to send response to transaction manager. If, at 705, the write data is not a special data at 704, the outstanding command buffer OCB table is updated and at 707, an opcode is added to the appropriate command queue CQ 220, and at 708 the process ends. If, at 702, a response is received from a WDE 205, flow continues to 710 where the outstanding command buffer (OCB) table is updated. At 711, an updated status is sent to the transaction manager TM 203, and at 708 the process ends.

Each WDE 205 receives commands (op codes) from a corresponding CQ 220 in the WDEM 204. The WDE 205s are configured to perform deduplication determinations and other related computations. The WDEs 205 may run in parallel to improve overall throughput of the system partition 200. Each WDE 205 coordinates with the MRM 207 in each memory region for interleaving memory accesses.

Figure 8:
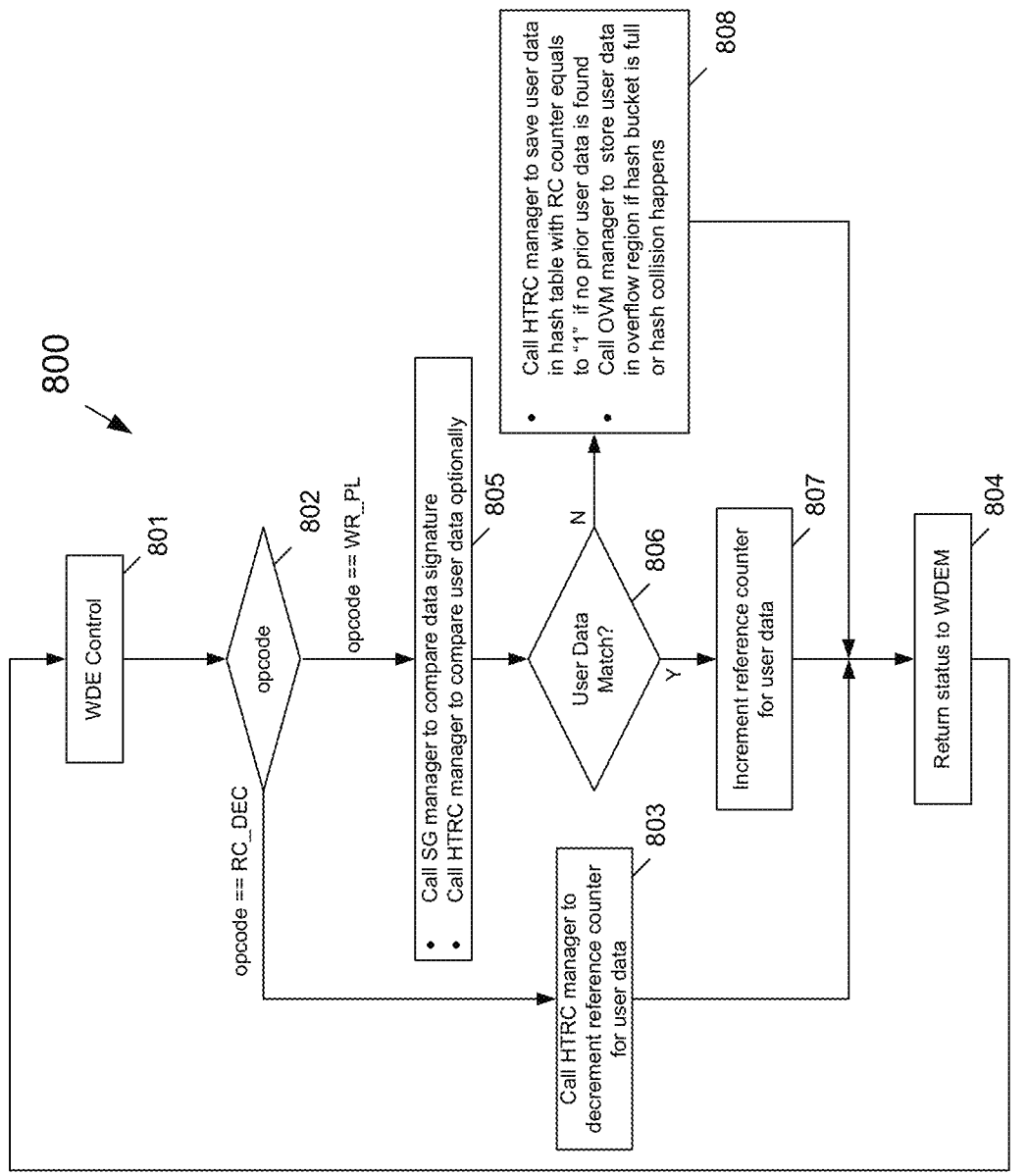
FIG. 8 depicts a flow diagram of an example control process provided by a write data engine according to the subject matter disclosed herein.

FIG. 8 depicts a flow diagram of an example control process 800 provided by the WDEs 205 according to the subject matter disclosed herein. At 801, a WDE 205 may be in an idle loop waiting to receive a command from the WDEM 204. At 802, it is determined whether the command is to compare the signature of user data to other user data signatures in the hash bucket or whether the command is to decrement RC counter. If the command (i.e., opcode) is to decrement RC counter, the flow continues to 803 where the RC for the user data is decremented. Flow then continues to 804 where status of the request is returned to the WDEM 204, and then back to 801.

If, at 802, a request received from the WDEM 204 is to write the user data (i.e., a physical line), flow continues to 805 to compare the signature of user data to other user data signatures in the hash bucket, flow continues to 805 where the signature of the user data is compared to other user data signatures, and further to compare the user data already stored in hash table. At 806, if there if there is a match, flow continues to 807 where the RC for the user data is incremented. Flow continues to 804 where the status of the request is reported back to the WDEM 204. If, at 806, there is not a match, flow continues to 808, where the HTRC manager is called to save user data in hash table with the RC counter equals to "1" if no prior user data is found; or to call an OVM manager to store user data in overflow region if hash bucket is full or hash collision happens. Flow continues to 804 to report the status of the request to the WDEM 204.

The MRMs 207 manage memory access to the MRs 207 for the WDEs 205. An MRM 207 includes a hash table/reference counter manager (HTRC MGR) 222, an overflow memory manager (OVM MGR) 223 and a signature manager (SIG MGR) 224. Each MRM 207 receives control and data information from the each of the WDEs 205 for the HTRC MGR 222 (HR RAY), the OVM MGR 223 (OVM R/W) and the SIG MGR 224 (SIG R/W).

Figure 9A:
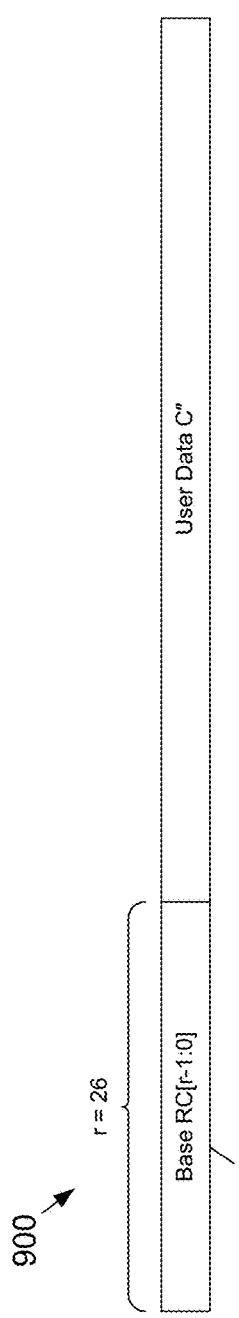
FIG. 9A depicts an example embodiment of a physical line containing a reconstructed field having an embedded reference counter according to the subject matter disclosed herein.

FIG. 9A depicts an example embodiment of a PL 900 containing a reconstructed field 901 having an embedded reference counter (RC) according to the subject matter disclosed herein. In one embodiment, the reconstructed field includes an embedded RC having a relatively small size because the number of times user data may be duplicated in the virtual memory space may be small. For such a system situation, the embedded RC may be configured to be a base RC having a size of r−1 bits.

In another embodiment in which the number of times user data may be duplicated in the virtual memory space of the host system may exceed the size of an embedded RC in the reconstructed field of a PL, the reconstructed field may include an index to an extended RC table entry. In still another embodiment, an indicator flag, such as a selected bit of a PL, may be used to indicate whether the number of duplications of the user data in the virtual memory space exceeds the size of the embedded RC.

Figure 9B:
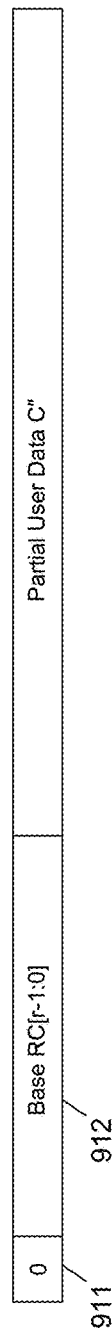
FIG. 9B depicts an example embodiment of a physical line that includes an indicator flag according to the subject matter disclosed herein.
Figure 9C:
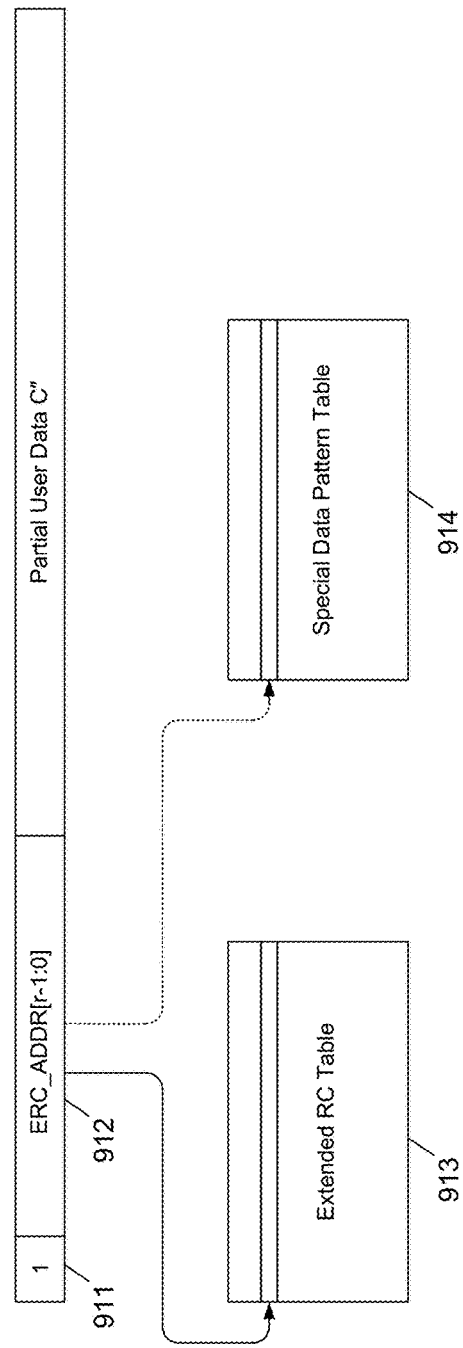
FIG. 9C depicts a situation in which an indicator flag is set to indicate that the number of duplications of the user data exceeds the size of an embedded reference counter in the reconstructed field, in which case the contents of the reconstructed field may contain an index to an extended reference counter table that has contains an extended count of the duplicated user data.

FIG. 9B depicts an example embodiment of a PL 910 that includes an indicator flag 911 according to the subject matter disclosed herein. As depicted in FIG. 9B, the indicator flag 911 is set to indicate that the number of duplications of the user data is equal to or less than the size of the embedded RC in the reconstructed field 912. Thus, the contents of the reconstructed field 912 would indicate the number of duplication of the user data in the virtual memory space of the host system 101. FIG. 9C depicts a situation in which the indicator flag 911 is set to indicate that the number of duplications of the user data exceeds the size of an embedded RC in the reconstructed field 912, in which case the contents of the reconstructed field may contain an index to an extended RC table 913 that has contains an extended count of the duplicated user data. Alternatively, the reconstructed field 912 may contain an index or a pointer to a special data pattern table 914 that may contain, for example, highly duplicated data. In one embodiment, the translation table may also include a PLID that is an index or a pointer to the special data pattern table 914, as depicted in FIG. 8, for highly duplicated user data to reduce the latency that would be associated with such a user data. That is, by placing a pointer or an index in the translation table, user data that is highly duplicated in the virtual memory space may be automatically detected when the translation table is accessed.

The MRs 209 each include a metadata memory region and multiple data memory regions. If the system partition 200 is configured as a deduplication memory, the metadata region includes the translation table 211. The data memory regions 209 include a hash table/reference counter (HTRC) memory (HTRC MEM), a signature memory (SG MEM), and an overflow memory (OV MEM).

Writes to the same physical memory region in the MRs 209 from different virtual addresses are managed by the MRMs 207. HTRC and SG managers 222 perform dedupe functions and calculate the memory location in terms of hash table row (a.k.a. bucket) and column location. The writes to the same HTRC bucket from different virtual addresses could arrive at the HTRC bucket with different ordering from the original ordering from the host. The consistency is managed by WDEM 204. If the write data, for example, write data A and write data B, arrive at the same PLID (A==B), then the RC counter may be simply incremented. If the write data from the different virtual addresses are not equal, have the same bucket number but different column (a.k.a. way) number, they may be stored into the same bucket, but different stored in different ways. If the bucket only has one entry left, either A or B will be stored into the last entry and the other one may be stored into the overflow region. If write data A and write data B are different, but have same hash bucket and row number, the second one will be stored in overflow region.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A memory system, comprising:
at least one system partition comprising:
a physical memory having a physical memory space of a first predetermined size;
at least one transaction manager (TM) that receives data write requests and corresponding data from a host system, the at least one TM using a transaction table to maintain data coherency and data consistency for a virtual memory space of the host system;
at least one write data engine manager (WDEM) comprising at least one command queue, the WDEM using an outstanding bucket number (OBN) and command queues to maintain data coherency and data consistency for the physical memory space, the WDEM receiving the data write requests from the TM and sending a write command corresponding to each data write request to a selected command queue of the at least one command queue; and
a write data engine (WDE) corresponding to each command queue, the WDE responding to a write command stored in the command queue corresponding to the WDE by storing the data corresponding to a data write request in an overflow memory region based on the data not being duplicated in the virtual memory space, or incrementing a reference counter for the data based on the data corresponding to a data write request being duplicated in the virtual memory space.

2. The memory system of claim 1, wherein the virtual memory space comprises a second predetermined size that is greater than or equal to the first predetermined size of the physical memory space, and wherein the memory system further comprises a translation table comprising a first predetermined number of bits corresponding to the second predetermined size of the virtual memory space, a second predetermined number of bits corresponding to the first predetermined size of the physical memory and a third predetermined number of bits for a data granularity, the second predetermined number of bits and the third predetermined number of bits being subsets of the first predetermined number of bits.

3. The memory system of claim 2, wherein the first predetermined number of bits comprises 40 bits, the second predetermined number of bits comprises 32 bits, and the third predetermined number of bits for the data granularity comprises 6 bits.

4. The memory system of claim 2, wherein the TM accesses the translation table in response to receiving a data write request to determine a physical address corresponding to a virtual address of the data write request.

5. The memory system of claim 1, wherein the TM maintains write-after-write data coherency and consistency for the virtual memory space of the host system.

6. The memory system of claim 1, wherein the TM uses the transaction table to track multiple data write requests received from the host system.

7. The memory system of claim 6, wherein the TM assigns a transaction identification (ID) to a received data write request, and
wherein the TM sends write completion messages to the host system in an order corresponding to the transaction IDs of the received data write requests.

8. The memory system of claim 6, wherein the TM further uses the transaction table to track multiple threads of write data requests.

9. A memory system, comprising:
a plurality of system partitions, at least one system partition comprising:
a physical memory having a physical memory space of a first predetermined size, the physical memory comprising a plurality of memory regions;
at least one transaction manager (TM) that receives data write requests and corresponding data from a host system, the at least one TM using a transaction table to maintain data coherency and data consistency for a virtual memory space of the host system, the virtual memory space comprising a second predetermined size that is greater than or equal to the first predetermined size of the physical memory space, and the at least one TM using a translation table to translate the virtual memory space of the host system to the physical memory space of the at least one system partition;
at least one write data engine manager (WDEM) comprising at least one command queue, the WDEM using an outstanding bucket number (OBN) and command queues to maintain data coherency and data consistency for the physical memory space, the WDEM receiving the data write requests from the TM and sending a write command corresponding to each data write request to a selected command queue of the at least one command queue;
a write data engine (WDE) corresponding to each command queue, the WDE responding to a write command stored in the command queue corresponding to the WDE by storing the data corresponding to the write request in an overflow region based on the data not being duplicated in the virtual memory space, or incrementing a reference counter for the data based on the data corresponding to a data write request being duplicated in the virtual memory space; and
a memory regional manager (MRM) corresponding to each memory region of the physical memory, the MRM comprising a reference counter storage space for data stored in the memory region, the MRM controlling WDE access to the memory region corresponding to the MRM.

10. The memory system of claim 9, wherein the translation table comprises a first predetermined number of bits corresponding to the second predetermined size of the virtual memory space, a second predetermined number of bits corresponding to the first predetermined size of the physical memory and a third predetermined number of bits for a data granularity, the second predetermined number of bits and the third predetermined number of bits being subsets of the first predetermined number of bits.

11. The memory system of claim 10, wherein the first predetermined number of bits comprises 40 bits, the second predetermined number of bits comprises 32 bits, and the third predetermined number of bits for the data granularity comprises 6 bits.

12. The memory system of claim 9, wherein the TM maintains write-after-write data coherency and consistency for the virtual memory space of the host system.

13. The memory system of claim 9, wherein the TM accesses the translation table in response to receiving a data write request to determine a physical address corresponding to a virtual address of the data write request.

14. The memory system of claim 9, wherein the TM uses the transaction table to track multiple data write requests received from the host system.

15. The memory system of claim 14 wherein the TM assigns a transaction identification (ID) to a received data write request, and
wherein the TM sends write completion messages to the host system in an order corresponding to the transaction IDs of the received data write requests.

16. The memory system of claim 14, wherein the TM uses the transaction table to track multiple threads of write data requests.

17. A deduplication memory system, comprising:
a plurality of system partitions, at least one system partition comprising:
a physical memory having a physical memory space of a first predetermined size;
at least one transaction manager (TM) that receives data write requests and corresponding data from a host system, the at least one TM using a transaction table to maintain data coherency and data consistency for a virtual memory space of the host system, the virtual memory space comprising a second predetermined size that is greater than or equal to the first predetermined size of the physical memory space, the at least one TM using a translation table to translate the virtual memory space of the host system to the physical memory space of the at least one system partition, the transaction table comprising a first predetermined number of bits corresponding to the second predetermined size of the virtual memory space, a second predetermined number of bits corresponding to the first predetermined size of the physical memory and a third predetermined number of bits for a data granularity, the second predetermined number of bits and the third predetermined number of bits being subsets of the first predetermined number of bits;
at least one write data engine manager (WDEM) comprising at least one command queue, the WDEM using an outstanding bucket number (OBN) and command queues to maintain data coherency and data consistency for the physical memory space, the WDEM receiving the data write requests from the TM and sending a write command corresponding to each data write request to a selected command queue of the at least one command queue; and
a write data engine (WDE) corresponding to each command queue, the WDE responding to a write command stored in the command queue corresponding to the WDE by storing the data corresponding to the write request in an overflow region based on the data not being duplicated in the virtual memory space, or incrementing a reference counter based on the data corresponding to a data write request being duplicated in the virtual memory space.

18. The deduplication memory system of claim 17, wherein the physical memory comprises a plurality of memory regions,
the deduplication memory system further comprising a memory regional manager (MRM) corresponding to each memory region of the physical memory, the MRM comprising a reference counter storage space for data stored in the memory region, the MRM controlling WDE access to the memory region corresponding to the MRM.

19. The deduplication memory system of claim 18, wherein the first predetermined number of bits comprises 40 bits, the second predetermined number of bits comprises 32 bits, and the third predetermined number of bits for the data granularity comprises 6 bits.

20. The deduplication memory system of claim 19, wherein the TM uses the transaction table to track multiple threads of write data requests.

* * * * *